United States Patent [19]

Mize

[11] Patent Number: 5,176,445
[45] Date of Patent: Jan. 5, 1993

[54] APPARATUS FOR DECONTAMINATING SOILS

[75] Inventor: E. Gail Mize, Chattanooga, Tenn.

[73] Assignee: Astec Industries, Inc., Chattanooga, Tenn.

[21] Appl. No.: 565,945

[22] Filed: Aug. 10, 1990

[51] Int. Cl.$^5$ .............................................. B28C 5/46
[52] U.S. Cl. ................................. 366/7; 366/22; 366/25; 366/144; 47/1.42; 34/60; 110/236; 432/72
[58] Field of Search ............... 366/2, 7, 6, 22, 23, 366/24, 25, 30, 33, 34, 37, 40, 54, 57, 318, 50, 64, 144, 145, 228; 432/13, 14, 16, 18, 72, 89, 92, 105, 108, 111; 47/1.42; 110/233, 236, 346; 34/13, 19, 26, 32, 60, 61, 62, 63, 72, 82, 90, 75, 91, 132, 136, 137, 140

[56] References Cited

U.S. PATENT DOCUMENTS

| | | | |
|---|---|---|---|
| 1,607,713 | 11/1926 | Wickey | 366/50 X |
| 3,472,498 | 10/1969 | Price et al. | 432/72 X |
| 3,512,340 | 5/1970 | Golucke et al. | 432/72 X |
| 3,880,143 | 4/1975 | Hart et al. | 432/72 X |
| 4,025,057 | 5/1977 | Shearer | 366/25 X |
| 4,096,588 | 6/1978 | Mendenhall | 366/7 |
| 4,147,502 | 4/1979 | Milton, Jr. | 432/72 |
| 4,211,490 | 7/1980 | Brock et al. | 366/25 |
| 4,277,180 | 7/1981 | Munderich | 366/7 |
| 4,309,113 | 1/1982 | Mendenhall | 366/4 |
| 4,318,619 | 3/1982 | Schlarman | 366/4 |
| 4,354,825 | 10/1982 | Fisher et al. | 432/72 X |
| 4,411,530 | 10/1983 | Low et al. | 366/4 |
| 4,477,250 | 10/1984 | Brashears et al. | 432/72 X |
| 4,540,287 | 9/1985 | Servas et al. | 366/7 |
| 4,638,747 | 1/1987 | Brock et al. | 366/12 X |
| 4,705,404 | 11/1987 | Bruggemann | 366/7 |
| 4,715,720 | 12/1987 | Brock | 366/25 |
| 4,715,965 | 12/1987 | Sigerson et al. | 210/800 |
| 4,782,625 | 11/1988 | Gerken et al. | 47/1.42 |
| 4,802,139 | 1/1989 | Sasaki | 366/16 |
| 4,815,398 | 3/1989 | Keating, II et al. | 110/233 |
| 4,827,854 | 5/1989 | Collette | 110/237 |
| 4,897,528 | 1/1990 | Anthony | 432/72 X |
| 4,951,417 | 8/1990 | Gerken et al. | 47/1.42 |
| 4,954,995 | 9/1990 | Marconnet | 366/25 X |
| 4,957,429 | 9/1990 | Mendenhall | 432/14 |
| 4,957,434 | 9/1990 | Radomsky | 366/25 X |

FOREIGN PATENT DOCUMENTS 1-163302 6/1989 Japan .................................. 366/25

OTHER PUBLICATIONS

"SCR Registers Company Name; Patent Pending on Remediation Technology".

Primary Examiner—Philip R. Coe
Assistant Examiner—Mark Spisich
Attorney, Agent, or Firm—Bell, Seltzer, Park & Gibson

[57] ABSTRACT

An apparatus is disclosed which is capable of efficiently decontaminating soil, and which has several common components with a conventional asphalt production plant. This feature permits a conventional asphalt plant to be retrofitted by the addition of a relatively small number of additional components, so as to permit the apparatus to selectively produce asphalt, or to decontaminate soil. When operated in the configuration for decontainating soil, the soil is initially heated to a temperature above the vaporization temperature but below the autoignition temperature of the contaminants, so as to volatilize the contaminants. The volatilized contaminants are then delivered to an incinerator, wherein the volatilized contaminants are heated to a temperature sufficient to be converted to non-toxic products, such as carbon dioxide and water.

13 Claims, 1 Drawing Sheet

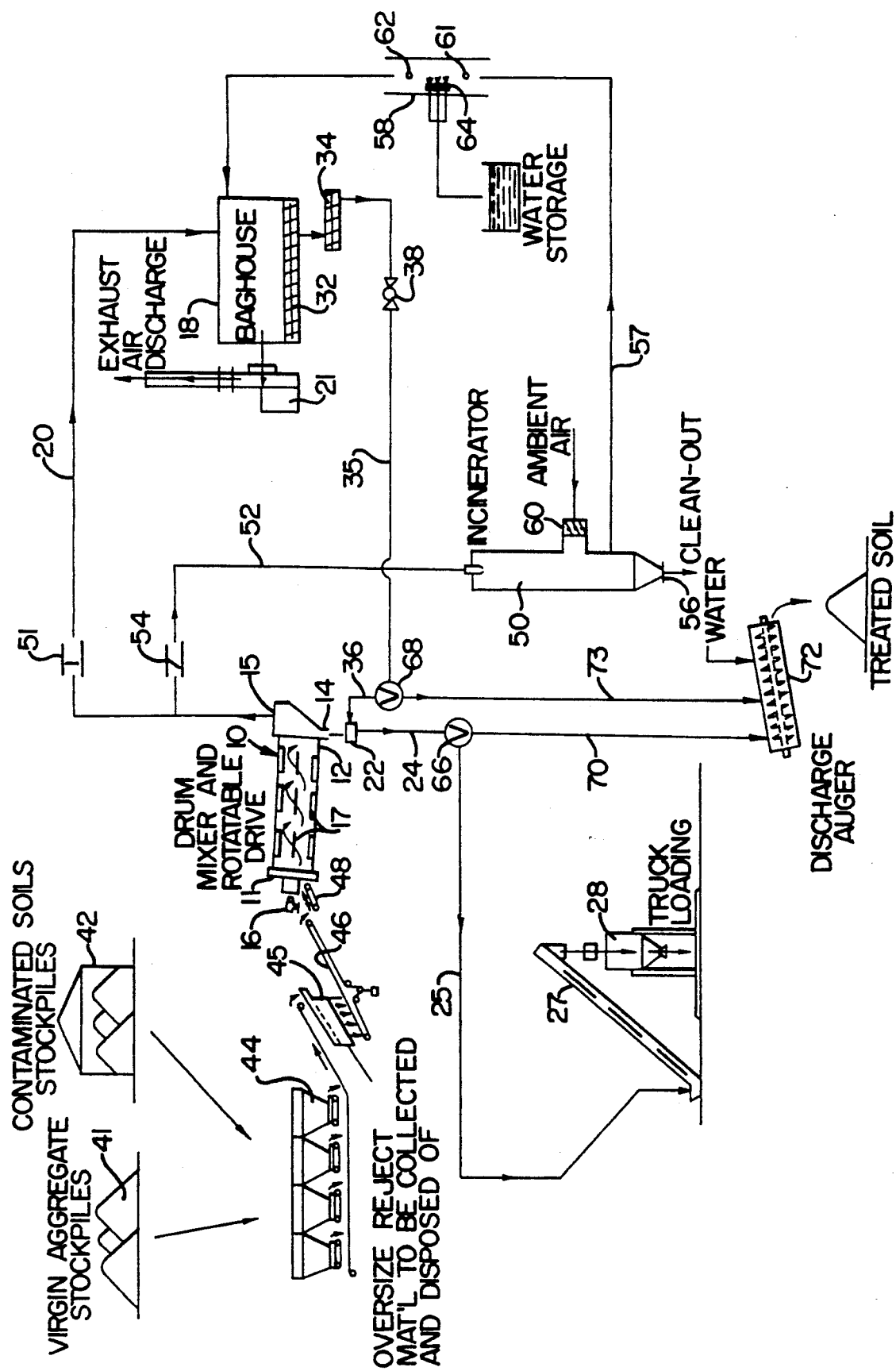

5,176,445

APPARATUS FOR DECONTAMINATING SOILS

BACKGROUND OF THE INVENTION

The present invention relates to an apparatus which is selectively operable for either producing asphalt suitable for highway construction, or for the decontamination of petroleum contaminated soils and the like.

The effective cleanup and disposal of soils which are contaminated with petroleum products and other contaminates have recently become major environmental concerns. As one specific example of the problem, a large number of underground fuel tanks have been found to be leaking and releasing a variety of contaminates into the surrounding soil, and as these tanks are being removed and repaired pursuant to environmental regulations, the volume of contaminated soil has been growing. Many communities no longer permit such soil to be placed in landfills, and thus a need exists for the decontamination of the soils.

One method of decontamination is to simply incinerate the soil, but such thermal treatment is not completely effective since it tends to produce large quantities of nitrogen oxides which are released into the atmosphere, and which are believed to contribute to so-called acid rain. Also, thermal treatment alone is not totally effective for soils contaminated with non-volatile heavy metals, and the incineration of soils containing volatile metals in high concentrations also presents a significant problem of emissions into the atmosphere.

U.S. Pat. No. 4,815,398 to Keating et al discloses an apparatus for detoxifying soil wherein the soil is initially heated to a relatively low temperature in a rotary dryer so as to volatilize the contaminants, and the volatilized contaminants are then fed to a high temperature rotary kiln which converts the volatile contaminants to non-toxic products which are then released to the atmosphere. This system is seen to be more effective in avoiding the release of contaminants to the atmosphere as compared to the prior incineration systems, but the apparatus is relatively costly, and it is not economically suitable to periodically process relatively small amounts of contaminated soil.

It is accordingly an object of the present invention to provide an apparatus for effectively and economically decontaminating petroleum contaminated soils and the like.

SUMMARY OF THE INVENTION

The above and other objects and advantages of the present invention are achieved in the embodiment illustrated herein by the provision of a soil decontamination apparatus which utilizes several of the components of an existing asphalt production plant to thereby significantly reduce the effective cost of the soil decontamination apparatus. In this regard, presently existing hot mix asphalt production plants, of the type suitable for producing asphalt for highway construction, typically include a gas fired rotary drum mixer wherein stone aggregate is heated and dried, and a large baghouse through which the discharged air from the drum dryer is circulated and cleaned before being exhausted to the atmosphere. The heated and dried aggregate is mixed with liquid asphalt in the drum mixer or in a downstream coating box, and the resulting product is fed to a storage bin from which it is periodically delivered to a truck for transport to a jobsite. In accordance with the present invention, these components of an existing asphalt plant are utilized as components of the apparatus for the decontamination of soil, and so as to provide a soil decontamination facility at minimal cost.

More particularly, the present invention comprises a rotary drum mixer which includes burner means for delivering heated air into the interior of the mixer, drive means for rotating the mixer about a fixed rotational axis, an inlet adjacent one end of the mixer for receiving a particulate material to be processed, a first outlet adjacent the other end of the mixer for the delivery of the material therefrom, and a second outlet for the removal of gasses from the interior of the mixer. Means are provided for selectively applying liquid asphalt or the like to the heated and dried material to form hot mix asphalt. The apparatus also includes a baghouse having air filters for cleaning particulates from an airstream passing therethrough, and an incinerator having means for heating an airstream passing therethrough to a temperature sufficient to effectively incinerate vaporized contaminants therein and for then delivering the airstream to the baghouse. A first air duct is provided for conveying the heated gasses from the second outlet of the mixer to the baghouse, a second air duct is provided for conveying the heated gasses from the second outlet of the mixer to the incinerator, and valve means is provided for selectively opening one of the first or second air ducts while closing the other of the air ducts.

In the preferred embodiment, the incinerator further includes means for selectively introducing a controlled amount of ambient air into the airstream passing therethrough to cool the airstream before it enters the baghouse. Also, means may be provided for sensing the temperature of the airstream between the incinerator and the baghouse, together with an emergency water spray system which is responsive to the temperature sensing means and for further reducing the temperature of the airstream before it enters the baghouse.

BRIEF DESCRIPTION OF THE DRAWING

Some of the objects and advantages of the present invention having been stated, others will appear when considered in conjunction with the accompanying drawing, which is a schematic representation of an apparatus in accordance with the present invention.

DETAILED DESCRIPTION OF THE PREFERRED EMBODIMENT

Referring more particularly to the drawing, the illustrated apparatus includes a conventional rotary drum mixer 10 of the type disclosed for example in U.S. Pat. Nos. 4,638,747 and 4,211,490. The drum mixers as disclosed in the above patents and the present drawing are parallel flow dryers, wherein the aggregate and the heated gases flow in the same direction. However, a counterflow dryer, such as disclosed in U.S. Pat. No. 4,867,572 may also be utilized with the present invention. The disclosures of these three prior U.S. patents are expressly incorporated herein by reference.

As more particularly described in the cited patents, the mixer 10 comprises a drum which is mounted for rotation about a rotational axis which is somewhat inclined from the horizontal, and so as to define an upper end 11 and a lower end 12. The material to be processed is introduced into an inlet at the upper end 11, and an outlet 14 for the material is provided adjacent the lower end 12. A further outlet 15 adjacent the lower end is provided for the removal of gases from the interior of the mixer. As is conventional, the interior of the drum mixer 10 includes a series of vanes or flights 17 which serve to lift and cascade the material through the interior of the drum as the drum rotates, and so as to cause the material to move in a helical path from the inlet toward the outlet.

A gas fired burner 16, which includes a suitable blower, is positioned at the upper end of the drum mixer, and so as to deliver heated air into the interior of the mixer. Liquid asphalt may be injected into the drum at an intermediate point along its length to coat the dried aggregate, and the rotation of the drum and the flights on the inner surface of the drum serve to mix the liquid asphalt and aggregate thoroughly in the lower or mixing portion of the drum.

The apparatus further includes a baghouse 18 having a plurality of air filtration bags for cleaning particulates from an airstream passing therethrough. The baghouse 18 is connected to the outlet 15 of the drum mixer via a first air duct 20. An exhaust fan 21 pulls air through the baghouse and from the drum mixer, so that the aggregate dust is filtered by the air flow passing through the baghouse, and the cleaned air is then exhausted to the atmosphere.

A coating box 22 may be mounted below the drum mixer 10 in communication with the material outlet 14, with the coating box having provision for adding additional liquid asphalt to the material if desired. From the coating box, the material is conveyed through material lines 24, 25 to the inlet end of drag conveyor 27, which lifts the material to the top of a storage bin 28. The bin is also of conventional design, and is adapted to deposit selected quantities of the material into an underlying truck.

The baghouse 18 may also include a gathering screw 32 along the lowermost portion thereof for periodically conveying the removed particulates to an outlet which communicates with a transfer screw 34. The transfer screw 34 in turn delivers the material to lines 35, 36 which lead to the coating box 22, so as to blend the material with the output of the mixer 10. The line 35 also preferably includes an airlock 38.

The virgin aggregate, which typically comprises crushed rock or gravel, is stored in one or more open stockpiles 41, while the contaminated soils are preferably stored in an enclosed stockpile 42. These materials are periodically delivered to one of the cold feed bins 44, which in turn selectively deliver the material to a segregating screen 45, which permits the properly sized material to drop onto an inclined conveyor 46 while the oversized material is rejected to a separate pile for subsequent collection and disposal. The inclined conveyor 46 delivers the material to a slinger feeder 48, which in turn deposits the material in the inlet of the drum mixer 10.

The apparatus to the extent described above comprises a conventional hot mix asphalt plant. In accordance with the present invention, an existing asphalt plant having the above described components may be retrofitted with certain additional components as described below, so as to permit the apparatus to be selectively operable either for producing asphalt in the conventional manner, or for the decontamination of petroleum contaminated soils and the like. The utilization of the basic components of the conventional asphalt plant in a different industrial application, namely the decontamination of soil, not only permits the fabrication of a soil decontamination apparatus at relatively low initial cost, but it also greatly increases the economic utilization of the basic components of the asphalt plant.

The additional components associated with the apparatus of the present invention include an incinerator 50 having a gas fired burner for heating an airstream passing therethrough to a temperature sufficient to effectively incinerate vaporized contaminants therein. A butterfly control valve 51 is fitted in the air duct 20 leading to the baghouse, and the incinerator is connected to a second air duct 52 which is connected to the duct 20 at a point upstream of the control valve 51. The second air duct 52 includes a second butterfly valve 54 for selectively opening and closing the air duct 52 to the incinerator. The two valves 51, 54 are preferably controlled in unison, such that when one of the valves is open, the other valve is closed.

The bottom of the incinerator 50 includes a clean out valve 56, and the air outlet of the incinerator is connected to an air duct 57 which leads through an emergency temperature control station 58 to the baghouse 18. The incinerator 50 also includes a modulating air damper 60 for selectively introducing a controlled amount of ambient air into the airstream passing therethrough, to cool the airstream before it enters the baghouse. The opening of the damper 60, and thus the amount of the diluting ambient air entering the baghouse, is controlled by a high temperature thermocouple 61 which is operatively connected to the modulating air damper 60 so as to control the opening of the damper and thereby maintain a temperature of not more than about 350° to 375° F. in the airstream entering the baghouse. At the emergency temperature control station 58, the temperature is monitored by a second thermocouple 62, and water is sprayed into the airstream via the nozzles 64 in an emergency where the temperature is at a level above the indicated range and which may destroy the filter bags in the baghouse.

The apparatus of the present invention also includes a gate valve 66 positioned at the juncture of the lines 24, 25, and a second gate valve 68 positioned at the juncture of the lines 35, 39. In one position of the valve 66, the line 24 is open to the line 25, but in another position of the valve 66, the material flows from the line 24 to a further output line 70 which leads to the inlet of a discharge auger 72. Similarly, in one position of the valve 68, the line 35 is open to the line 36, but in another position of the valve 68, the material flows from line 35 to a further output line 73 which leads to the inlet of the auger 72.

The valves 66, 68 thus permit the processed material from the drum mixer 10 and the particulates collected in the baghouse 18, to be selectively delivered either to the drag conveyor 27 and storage bin 28, or to the discharge auger 72. The discharge auger 72 preferably includes a water spray system for cooling and dust control, and the output may be delivered to a stockpile.

A high efficiency cyclone separator (not shown) may if desired be positioned in the air duct 52 upstream of the incinerator 50, which would serve to remove the larger particulates at this point in the process and minimize the effects of particulate fallout in the incinerator and baghouse. The removed material preferably would be delivered to the discharge auger 72 for blending with the materials received from the drum mixer and baghouse.

The operation of the apparatus, when configured for the production of asphalt, will first be described. In this configuration, the virgin aggregate is delivered from the stockpiles 41 to the drum mixer 10 where it is dried, heated, and coated with liquid asphalt. The gate valves 66, 68 are set so as to deliver the asphalt product of the drum mixer and the particulates collected in the baghouse, to the drag conveyor 27 and storage bin 28. Also, the valve 51 to the baghouse 18 is open and the valve 54 to the incinerator is closed, such that the gas from the drum mixer is conveyed to the baghouse without passing through the incinerator. The gas leaving the mixer typically is at a temperature of 310° to 330° F., and the asphalt product is a few degrees below this temperature while it is conveyed to the storage bin. The gas is cleaned in the baghouse and then discharged to the atmosphere, with the dust from the baghouse being conveyed through lines 35, 36 to the coating box 22, where it is blended with the asphalt and then delivered to the drag conveyor 27 and into the storage bin 28.

When configured for the processing of contaminated soil, the gate valves 66, 68 are set so as to deliver the heated soil through the line 70 to the discharge auger 72, and the particulates through the line 73 to the discharge auger. Also, the valve 51 to the baghouse is closed, and the valve 54 to the incinerator is opened. The contaminated soil is conveyed from the stockpiles 42 into the drum mixer, where it is heated to a temperature ranging between about 450° to 750° F., which is a temperature above the vaporization temperature of the contaminants but below the autoignition temperature. As a result, the contaminants are separated from the soil and vaporized. The decontaminated soil is removed through the outlet and passes along the lines 24, 70 to the inlet of the discharge auger. The vaporized contaminants and the products of combustion from the drum mixer are conveyed into the incinerator 50, and the vaporized contaminants are therein reduced by high temperature oxidation. More particularly, the burner of the incinerator provides an energy input sufficient to achieve a temperature which ranges from about 1200° to 1800° F., depending on the type of contaminants being treated. This temperature is held for a sufficient time such that the volatilized contaminants are converted by high temperature oxidation to carbon dioxide, water and other non-toxic products. The airstream is then cooled by the addition of ambient air which enters the air-stream through the modulating damper 60, with the rate of the ambient air entering the incinerator through the damper being controlled by the thermocouple 61 so that the airstream reaching the baghouse does not have a temperature above about 375° F. This temperature is also monitored by the thermocouple 62 at the emergency temperature control station 58, and water is sprayed into the airstream if necessary to further lower the temperature and thereby protect the bags in the baghouse.

The particulates are collected in the bottom of the baghouse and removed by an auger system which transports the material to the discharge auger via the lines 35, 73. The particulates are therein mixed back into the soils received from the drum mixer, with the water spray effecting cooling and dust control.

In the drawings and specification, there has been set forth a preferred embodiment of the invention, and although specific terms are employed, they are used in a generic and descriptive sense only and not for purposes of limitation.

That which is claimed is:

1. An apparatus which is selectively operable for either producing asphalt suitable for highway construction or for the decontamination of petroleum contaminated soils and the like, and comprising
   a rotary drum mixer which includes burner means for delivering heated air into the interior of the mixer, drive means for rotating the mixer about a fixed rotational axis, an inlet adjacent one end of the mixer for receiving a particulate material to be processed, a first outlet adjacent the other end of the mixer for the delivery of the material therefrom, and a second outlet for the removal of gasses from the interior of the mixer,
   means for selectively applying liquid asphalt or the like to the material processed in said mixer,
   a baghouse having means for cleaning particulates from an airstream passing therethrough,
   an incinerator having means for heating an airstream passing therethrough to a temperature sufficient to effectively incinerate vaporized contaminants therein and air duct means for delivering the airstream from the incinerator to said baghouse,
   first air duct means for conveying the heated gasses from said second outlet of said mixer to said baghouse,
   second air duct means for conveying the heated gasses from said second outlet of said mixer to said incinerator, and
   valve means for selectively opening either one of said first or second air duct means while closing the other of said air duct means.

2. The apparatus as defined in claim 1 wherein said incinerator further includes means for selectively introducing a controlled amount of ambient air into the airstream passing therethrough.

3. The apparatus as defined in claim 1 wherein said duct means for delivering the airstream from said incinerator to said baghouse includes means for sensing the temperature of the airstream, and means responsive to said sensing means for introducing a water spray into the airstream to reduce the temperature thereof before it enters said baghouse.

4. The apparatus as defined in claim 1 further comprising
   a storage bin,
   a discharge auger having a water delivery means for spraying water on the material processed therein,
   means for selectively delivering the material processed by said mixer to said storage bin or said discharge auger, and
   means for selectively delivering particulates separated from the airstream in said baghouse to said storage bin or said discharge auger.

5. The apparatus as defined in claim 1 further comprising blower means operatively connected to said baghouse for drawing the airstream therethrough and releasing the same to the environment.

6. The apparatus as defined in claim 1 wherein said rotational axis of said drum mixer is inclined from the horizontal, and with said one end being elevated with respect to said other end of said mixer, and wherein said mixer includes internal vane means for lifting and cascading the particulate material during rotation of the mixer and as the material moves from said one end toward said other end.

7. An apparatus which is selectively operable for either producing asphalt suitable for highway construction or for the decontamination of petroleum contaminated soils and the like, and comprising
  a rotary drum mixer which includes burner means for delivering heated air into the interior of the mixer, drive means for rotating the mixer about a fixed rotational axis, an inlet adjacent one end of the mixer for receiving a particulate material to be processed, a first outlet adjacent the other end of the mixer for the delivery of the material therefrom, and a second outlet for the removal of gasses from the interior of the mixer, said rotational axis of said drum mixer being inclined from the horizontal, and with said one end being elevated with respect to said other end of said mixer, and wherein said mixer includes internal vane means for lifting the cascading the particulate material during rotation of the mixer and as the material moves from one end toward said other end,
  means for selectively applying liquid asphalt or the like to the material processed in said mixer,
  a baghouse having means for cleaning particulates from an airstream passing therethrough,
  an incinerator having means for heating an airstream passing therethrough to a temperature sufficient to effectively incinerate vaporized contaminants therein, said incinerator including means for selectively introducing a controlled amount of ambient air into the airstream passing therethrough,
  means for delivering the airstream from said incinerator to said baghouse and including means for sensing the temperature of the airstream, and means responsive to said sensing means for introducing a water spray into the airstream to reduce the temperature thereof before it enters said baghouse,
  first air duct means for conveying the heated gasses from said second outlet of said mixer to said baghouse,
  second air duct means for conveying the heated gasses from said second outlet of said mixer to said incinerator, and
  valve means for selectively opening either one of said first or second air duct means while closing the other of said air duct means.

8. A method of selectively producing asphalt suitable for highway construction, or decontaminating petroleum contaminated soil or the like, and comprising the steps of
  heating and drying stone aggregate in a rotary drum mixer by contacting the same with heated gases, and while applying liquid asphalt to the heated and dried aggregate,
  conveying the heated gases through a first air duct from the rotary drum mixer to a baghouse wherein the gases are filtered and released to the atmosphere, and thereafter
  heating contaminated soil in said rotary drum mixer to a temperature above the volatilization temperature of the contaminants but below the autoignition temperature of the contaminants, and so as to volatilize the contaminants,
  conveying the volatilized contaminants through a second air duct to an incinerator and heating the volatilized contaminants therein to a temperature sufficient to effectively oxidize the volatilized contaminants and form non-toxic gaseous products, and then
  conveying the gaseous products from said incinerator to said baghouse, and such that the gaseous products are filtered and released to the atmosphere.

9. The method as defined in claim 8 wherein the step of conveying the gaseous products from said incinerator to said baghouse includes cooling the gaseous products.

10. The method as defined in claim 9 wherein the step of cooling the gaseous products includes monitoring the temperature of the gaseous products, and introducing ambient air at a rate determined by the monitored temperature and which is sufficient to cool the gaseous products to a predetermined temperature range.

11. The method as defined in claim 10 wherein the step of cooling the gaseous products includes the further step of spraying water into the gaseous products upon the monitored temperature exceeding a predetermined maximum.

12. The method as defined in claim 8 wherein the step of heating the contaminated soil in said drum mixer includes heating the same to a temperature of between about 450° to 750° F.

13. The method as defined in claim 12 wherein the step of heating the volatilized contaminants in said incinerator includes heating the same to a temperature of between about 1200° to 1800° F.

* * * * *